United States Patent
Chng et al.

(10) Patent No.: US 11,578,861 B2
(45) Date of Patent: Feb. 14, 2023

(54) INFRARED LIGHT MODULE UNIFORMITY ROTATIONAL TEST MODULE

(71) Applicant: Waymo LLC, Mountain View, CA (US)

(72) Inventors: Choon Ping Chng, Los Altos, CA (US); Cheng-Han Wu, Sunnyvale, CA (US); Lucian Ion, Santa Clara, CA (US); Giulia Guidi, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/657,554

(22) Filed: Mar. 31, 2022

(65) Prior Publication Data

US 2022/0221140 A1    Jul. 14, 2022

Related U.S. Application Data

(62) Division of application No. 17/084,335, filed on Oct. 29, 2020, now Pat. No. 11,320,124.

(51) Int. Cl.
*F21V 21/30* (2006.01)
*B60Q 3/51* (2017.01)
*B60K 35/00* (2006.01)
*G01J 1/00* (2006.01)

(52) U.S. Cl.
CPC ............. *F21V 21/30* (2013.01); *B60K 35/00* (2013.01); *B60Q 3/51* (2017.02); *G01J 1/00* (2013.01); *B60K 2370/21* (2019.05); *B60K 2370/332* (2019.05)

(58) Field of Classification Search
CPC ... F21V 21/30; G01J 1/00; B60Q 3/51; B60K 35/00
See application file for complete search history.

(56) References Cited

U.S. PATENT DOCUMENTS

| | | |
|---|---|---|
| 7,599,060 B2 | 10/2009 | Hoshizaki et al. |
| 7,982,662 B2 | 7/2011 | Shaffer |
| 8,405,832 B2 | 3/2013 | Schmaelzle et al. |
| 8,519,343 B1 | 8/2013 | Mihailescu et al. |
| 8,836,922 B1 | 9/2014 | Pennecot et al. |
| 9,417,317 B2 | 8/2016 | Bridges et al. |
| 9,618,620 B2 | 4/2017 | Zweigle et al. |
| 9,958,268 B2 | 5/2018 | Ohtomo et al. |
| 10,031,214 B2 | 7/2018 | Rosenzweig et al. |
| 10,132,611 B2 | 11/2018 | Steffey et al. |
| 10,380,749 B2 | 8/2019 | Wohlfeld |
| 10,627,516 B2 | 4/2020 | Eichenholz |

(Continued)

OTHER PUBLICATIONS

Woongsun Jeon, et al., A Novel Collision Avoidance System for Bicycles, ACC, 2016, IEEE, Boston, MA.

*Primary Examiner* — Thomas M Sember
(74) *Attorney, Agent, or Firm* — McDonnell Boehnen Hulbert & Berghoff LLP

(57) ABSTRACT

Example embodiments described herein involve a system for testing a light-emitting module. The light-emitting module may include a mounting platform configured to hold a light-emitting module for a camera. The mounting platform may also be configured to rotate. The system may further include a housing holding a plurality of photodiodes arranged in an array over at least a 90 degree arc of a hemisphere. The system may also include a controller configured to control the photodiodes and the rotation of the mounting platform.

20 Claims, 7 Drawing Sheets

(56) References Cited

U.S. PATENT DOCUMENTS

| | | |
|---|---|---|
| 2010/0053593 A1 | 3/2010 | Bedros et al. |
| 2018/0149732 A1 | 5/2018 | Droz et al. |
| 2021/0030512 A1 | 2/2021 | Distler et al. |

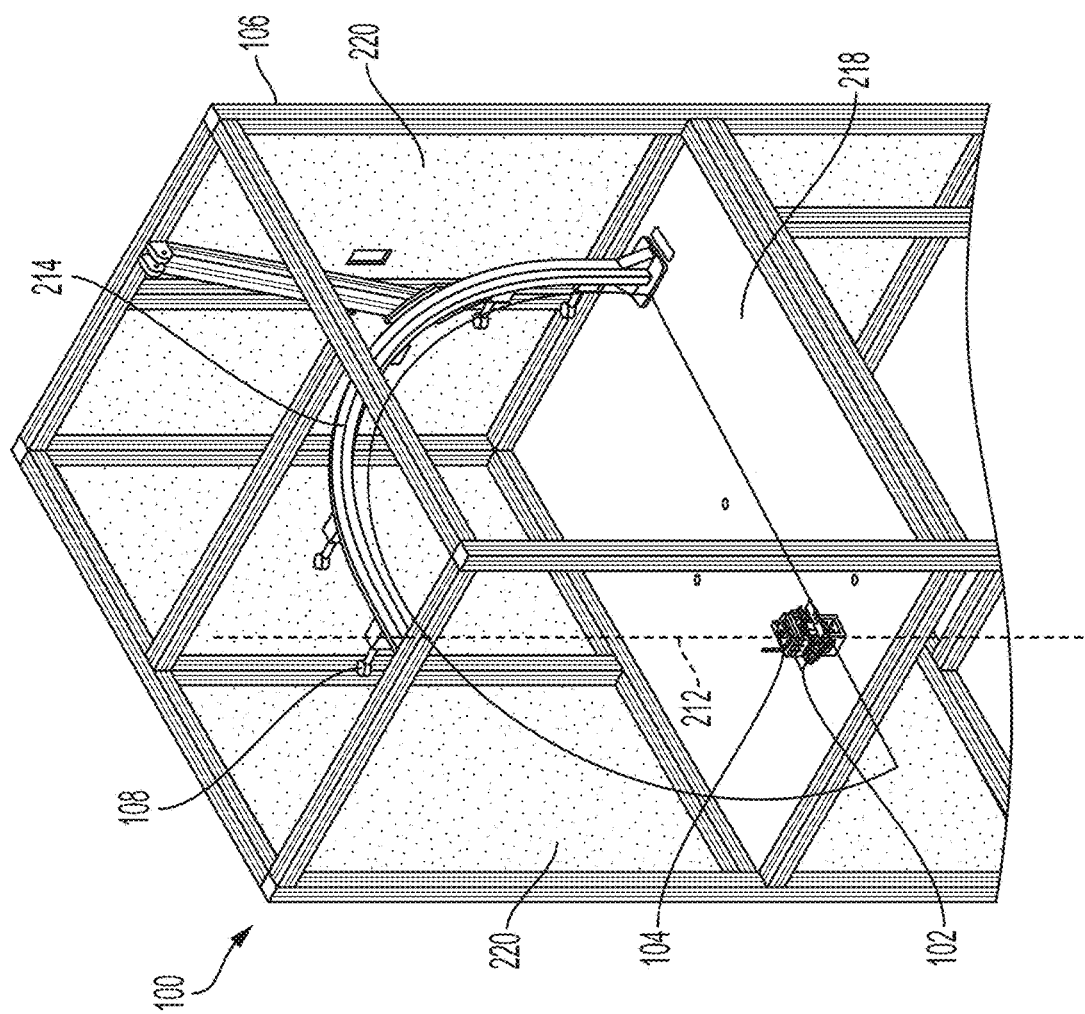

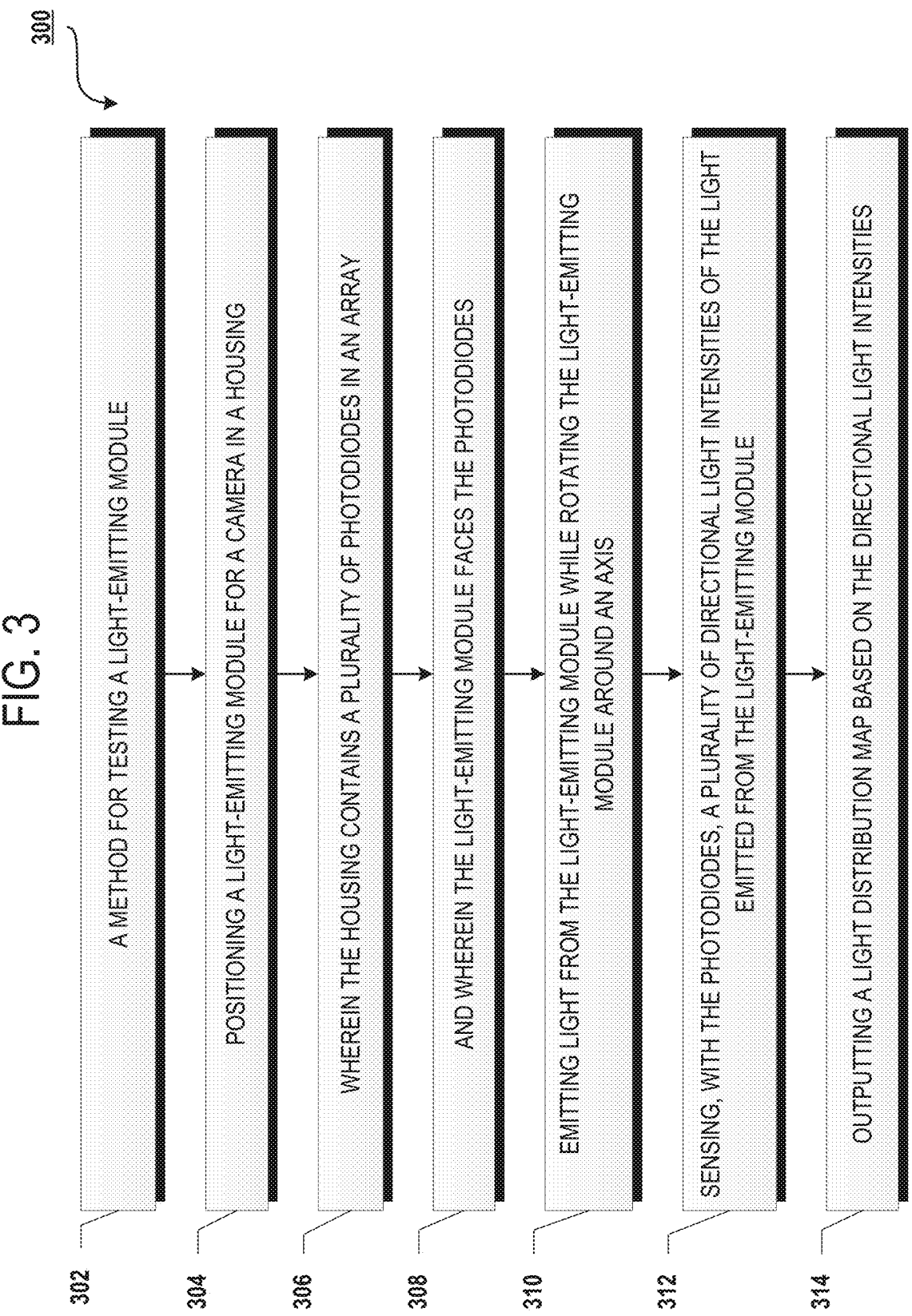

INFRARED LIGHT MODULE UNIFORMITY ROTATIONAL TEST MODULE

CROSS-REFERENCE TO RELATED APPLICATION

This application is a division of U.S. patent application Ser. No. 17/084,335, filed Oct. 29, 2020, the entirety of which is hereby incorporated by reference.

BACKGROUND

Lights are often used to sufficiently illuminate an area, especially when capturing images of that area. For example, a light may be used in the cabins of autonomous vehicles to provide light for capturing images of the inside of the cabin while it is dark. In order to capture the full area of the cabin, the lights may be capable of illuminating to the edges of the cabin. Testing of the light module can be used to verify that the illumination pattern is wide enough to cover the cabin of an autonomous vehicle or the required field of view. For example, the light may be tested by turning on the light and then measuring the illumination pattern using photodiodes at one location of the field of view at a time. The test may then be repeated at different fields of view and then combined to construct a three dimensional illumination pattern. This testing method may require more photodiodes to capture the illumination pattern as the degree of the illumination pattern increases.

SUMMARY

The present disclosure generally relates to measuring an illumination pattern of a light module and producing a three dimensional light distribution map indicating light intensity of the light module. Particularly, a light module testing unit may include an apparatus designed to measure the light intensity of a light module and the light intensities may be subsequently used to create a three dimensional light distribution map.

In one aspect, the present application describes a system for testing a light emitting module. The system may include a mounting platform configured to hold a light-emitting module for a camera. The mounting platform may be configured to rotate. The system may further include a housing. The housing may hold a plurality of photodiodes and the photodiodes may be arranged in an array over at least a 90 degree arc of a hemisphere. The system may also include a controller configured to control the photodiodes and the rotation of the mounting platform.

In another aspect, the present application describes a method for testing a light emitting module. The method may involve positioning a light-emitting module for a camera in a housing. The housing may contain a plurality of photodiodes in an array, and the light-emitting module may further face the photodiodes. The method may further involve emitting light from the light-emitting module while rotating the light-emitting module about an axis. The method may also involve sensing, with the photodiodes, a plurality of directional light intensities of the light emitted from the light-emitting module. The method may further involve outputting a light distribution map based on the directional light intensities.

In another aspect, the present application also describes a method for calibrating a light emitting module tester. The method may involve positioning a control light source in a housing. The housing may contain a plurality of photodiodes in an array, and the control light source may face the photodiodes. The method may further include emitting light from the control light source while rotating the control light source about an axis. The method may also include sensing, with the photodiodes, a plurality of directional light intensities of the control light source. The method may include outputting a light distribution map based on the directional light intensities.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

Example embodiments should become apparent from the following description, which is given by way of example only, of at least one preferred but non-limiting embodiment, described in connection with the accompanying figures.

FIG. 2A illustrates a perspective view of a system for testing a light emitting module, according to one or more example embodiments.

FIG. 3 illustrates a flow chart of a method for testing a light emitting module, according to one or more example embodiments.

DETAILED DESCRIPTION

Figure 1:
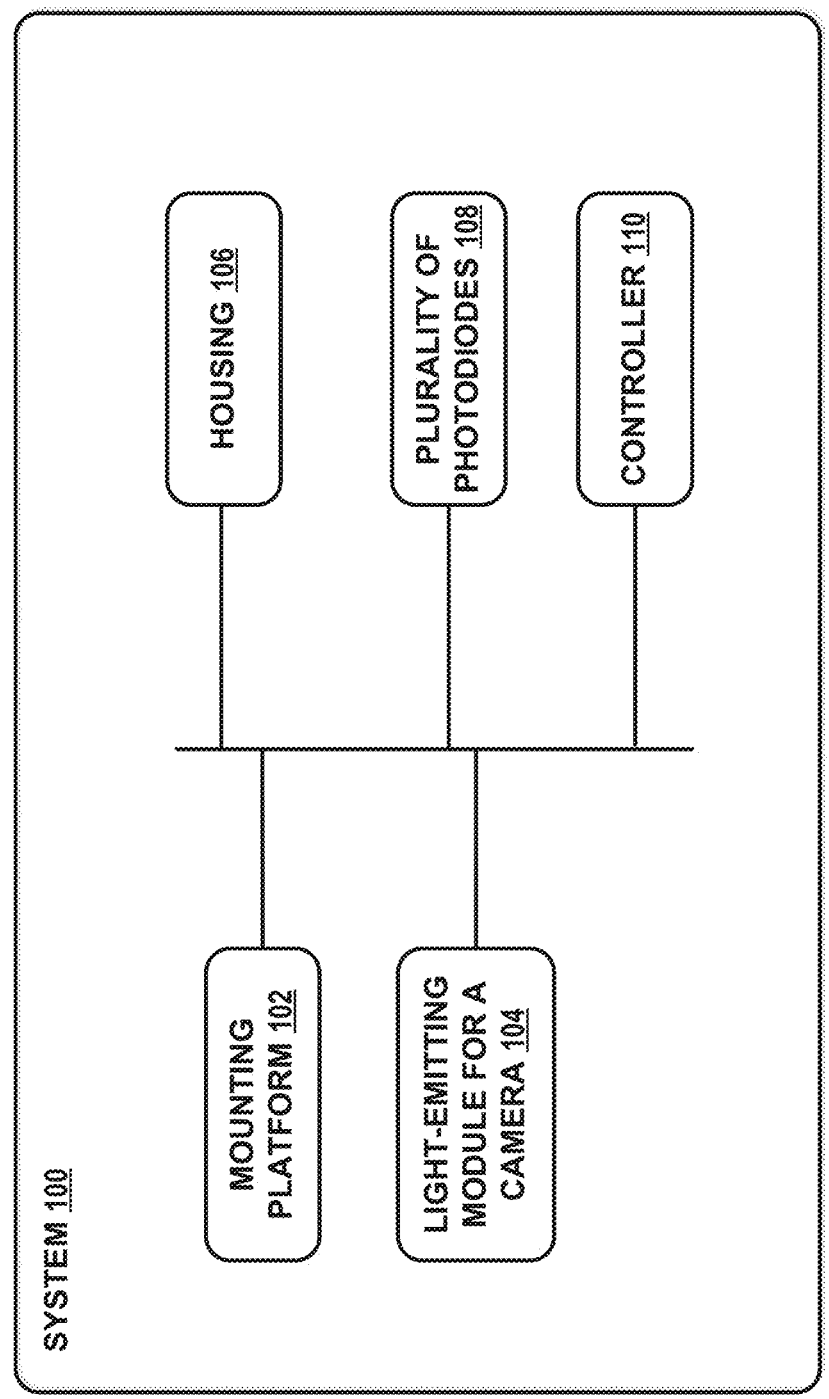
FIG. 1 illustrates a system for testing a light emitting module, according to one or more example embodiments.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein. Additionally, in this disclosure, unless otherwise specified and/or unless the particular context clearly dictates otherwise, the terms "a" or "an" means at least one, and the term "the" means the at least one.

Furthermore, the particular arrangements shown in the Figures should not be viewed as limiting. It should be understood that other implementations might include more or less of each element shown in a given Figure. Further, some of the illustrated elements may be combined or omitted. Yet further, an example implementation may include elements that are not illustrated in the Figures.

Vehicles, including autonomous vehicles, are often equipped with lights inside of the cabin to illuminate the cabin of the vehicle during night operation. For example, infrared illumination may be used. Moreover, during operation of an autonomous vehicle, the lights may be used to illuminate the cabin so that images might be captured inside of a dark vehicle. Captured images may provide information about the operation to improve user experience, including if any personal objects were left behind, whether the cabin is clean, and if user interfaces inside of the vehicle are working properly. In order to increase the range of the cabin included in the image, a wide angle camera may be used. Because images may be captured in a variety of light exposures, it may be desirable to include a light module that distributes light to at least the area covered by a wide angle camera, so that the edges of an image are illuminated as well as the center. Therefore, the light module should have a wide area of distribution. The distribution area of a light module can also be tested to verify that light will reach the edges of the cabin.

A variety of testing procedures are currently in use to measure the distribution of light. One method of testing includes placing a light module at the center of a circular field of photodiodes. The photodiodes may be positioned as spokes extending from the light module. Each spoke may include multiple photodiodes and be positioned a few degrees away from the next spoke. This method simultaneously tests all angles. Therefore, the distribution of the light in a 360 degree view is tested in one measurement. However, this method of testing is resource intensive as it requires a large number of photodiodes. Alternatively, one strip of photodiodes could be used to measure a single field of view of the light-emitting module. The measurement may then be repeated through different fields of view to create a light distribution of 360 degrees. However, this method of testing is labor and time intensive.

Example embodiments presented herein may involve a system for testing a light-emitting module. The testing module may test a light module efficiently in 360 and 180 degrees concurrently to create a three-dimensional light pattern. Such testing can verify that the light from the light-emitting module will cast enough light for imaging inside of a vehicle cabin. The system for testing may include a mounting platform configured to hold a light-emitting module for a camera. The light emitting module may be secured to the mounting platform for ease of testing. The mounting platform may also be configured to rotate. The system may further include a housing. The mounting platform may be positioned within the housing. The housing may hold a plurality of photodiodes arranged in an array over at least a 90 degree arc of a hemisphere. The mounting platform may be positioned at the center of the hemisphere facing at least one photodiode in the plurality of photodiodes. The system may further include a controller. The controller may be configured to control the photodiodes and the rotation of the mounting platform within the housing. The controller may also be configured to output a light distribution map based on the light intensity of the light module registered by the photodiodes.

The following detailed description may also be used for testing a light-emitting module, such as the one previously discussed. A light-emitting module for a camera may be positioned in a housing containing a plurality of photodiodes in an array. The light emitting module may face the photodiodes and emit light while rotating around an axis. The light-emitting module may rotate 360 degrees around while the photodiodes sense a plurality of directional light intensities of the light emitted from the light-emitting module. With the information gathered by the photodiodes, the method may include outputting a light distribution map based on the directional light intensities.

The detailed description may also be used with a method for calibrating a light-emitting module tester, such as the one previously discussed. In order to calibrate the light-emitting module tester, the method may include positioning a control light source in a housing. The housing may contain a plurality of photodiodes in an array with the control light source facing the photodiodes. The control light source may emit light while rotating around an axis. The method for calibrating may further include sensing, with the photodiodes, a plurality of directional light intensities of the control light source. Once the data for the directional light intensities is gathered, the method may include outputting a light distribution map based on the directional light intensities. Based on the outputted light distribution map, errors in the photodiode readings may be determined and calibrated to correct the error.

Referring now to the figures, FIG. 1 is a functional block diagram illustrating an example system 100 for testing a light emitting module. The system may test to measure the light distribution of a light module. The system 100 may include a mounting platform 102. The mounting platform 102 may hold a light-emitting module for a camera 104 such that the light-emitting module 104 is secured to the mounting platform 102. The light-emitting module 104 may be capable of emitting light in multiple frequencies, including infrared and/or ultraviolet light. The mounting platform 102 may further be configured to rotate within the system 100 with the light-emitting module 104 secured to the mounting platform 102.

The system may further include a housing 106 holding a plurality of photodiodes 108 arranged in an array. The photodiodes 108 may further be arranged over at least a 90 degree arc of a hemisphere. The hemisphere may represent the interior of a cabin of a vehicle. In an alternative embodiment, depending on the desired illumination profile, the photodiodes may be arranged in a different orientation and distance from the light module. For example, the area in need of illumination could be something other than a hemisphere, such as a square. In that case, the photodiodes could be arranged in a square pattern. The system may further include a controller 110. The controller 110 may control the photodiodes 108 sensing the light emitting from the light-emitting module 104, the rotation of the mounting platform 102, and turning on and off the light emitting module 104.

An example embodiment of the system 100 for testing a light emitting module is shown in FIG. 2A. The mounting platform 102 may be positioned within the housing 106 with the light emitting module 104 secured to the mounting platform 102. The light emitting module 104 may emit light while positioned below the plurality of photodiodes 108. The light emitting module 104 may also face the plurality of photodiodes 108 so that most of the emitted light is directed towards the photodiodes. This may allow the photodiodes 108 to sense the light emitted from the light-emitting module 104. The mounting platform 102 may further be configured to rotate about an axis 212. The axis 212 may intersect the center of the light emitting module 104. The axis 212 may also intersect an arc 214 on which the photodiodes 108 are arranged. The photodiodes 108 may be positioned on the arc over 90 degrees of a hemisphere 218 facing the light-emitting module 104. As the light-emitting module 104 rotates about the axis 212, the photodiodes 108 may sense the light and construct a three-dimensional light intensity map for the hemisphere 218. In an alternate embodiment, the light emitting module may remain fixed while the photodiodes are rotated relative to the module. For example, the arc that the photodiodes are positioned on may move about the axis that intersects the module with the top of the arc pivoting on the axis. The photodiodes on the arc may therefore sense the light emitted from the module and construct a three-dimensional light intensity map for the hemisphere as the arc moves around the hemisphere.

The housing 106 for the system for testing may also block external light from interfering with testing. For example, the housing 106 may be a box that encloses the mounting platform 104. Alternatively, the housing may be a tent that blocks external light. The housing 106 may further include a plurality of interior walls 220. The plurality of interior walls 220 may be covered by a light absorptive material. The light absorptive material may block stray light to improve testing conditions. The plurality of interior walls 220 may also be covered with anti-reflective material to minimize stray light during testing. The housing may also assist in providing a temperature controlled environment for testing the module. Maintaining the ambient temperature inside of the housing at a set value may improve the accuracy of the test results.

Figure 2B:
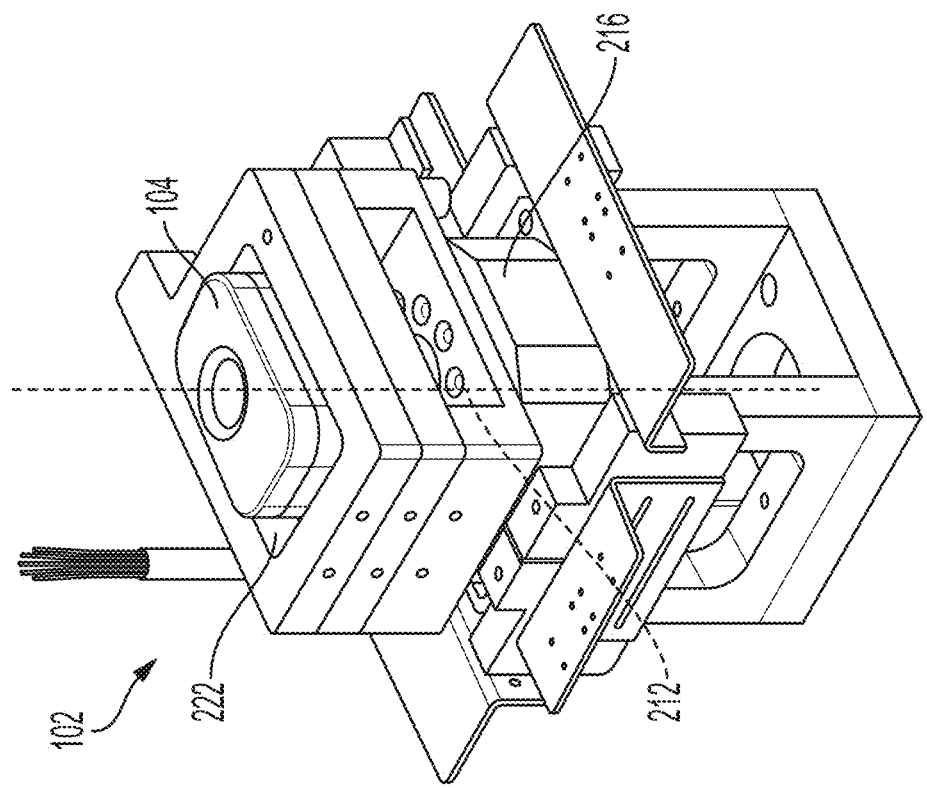
FIG. 2B illustrates a mounting platform, according to one or more example embodiments.

To test the light-emitting module 104 with the photodiodes 108, the light-emitting module 104 may be positioned on a mounting platform 102. FIG. 2B illustrates a perspective view of the mounting platform 102 according to an example embodiment. The mounting platform 102 may include various ways to secure the light-emitting module 104 to the mounting platform 102. For example, the mounting platform may include a fastener to secure the light-emitting module to the mounting platform. The fastener may include screws, straps, or clamps. Alternatively, the fastener could be an adhesive. In another alternative, the fastener may include a recess 222 in the mounting platform. The recess may also include stoppers on the walls or edges of the recess to secure the light-emitting module in the recess.

As shown in FIG. 2B, the system 100 may further include a motor 216 disposed on the mounting platform 102. The motor 216 may be disposed on the bottom of the mounting platform 102 in the center of the platform. Alternatively, the motor could be disposed to the side of the mounting platform and the motor may engage with the edge of the mounting platform to rotate the mounting platform. The motor 216 may rotate the mounting platform 102 about the axis 212 at the center of the mounting platform 102. The mounting platform 102 may spin around the axis so that the light-emitting module 104 may uniformly project light for the photodiodes 108 to sense. For example, the motor 216 may continuously rotate the mounting platform 102 through 360 degrees. Alternatively, the motor 216 may incrementally rotate the mounting platform 102 throughout the 360 degrees. For example, the motor 216 may rotate the mounting platform 102 a few degrees at a time through the 360 degrees. The controller 110 may be used to incrementally rotate the mounting platform 102.

The mounting platform 102 and the light-emitting module 104 may be at the center of the testing system. As previously discussed, the photodiodes may be arranged over at least a 90 degree arc of the hemisphere. As shown in FIG. 2A, the mounting platform 102 may be at the center of the hemisphere 218. This may assist in producing a read out of a hemisphere from the detected light emitted from the light-emitting module 104.

Figure 2C:
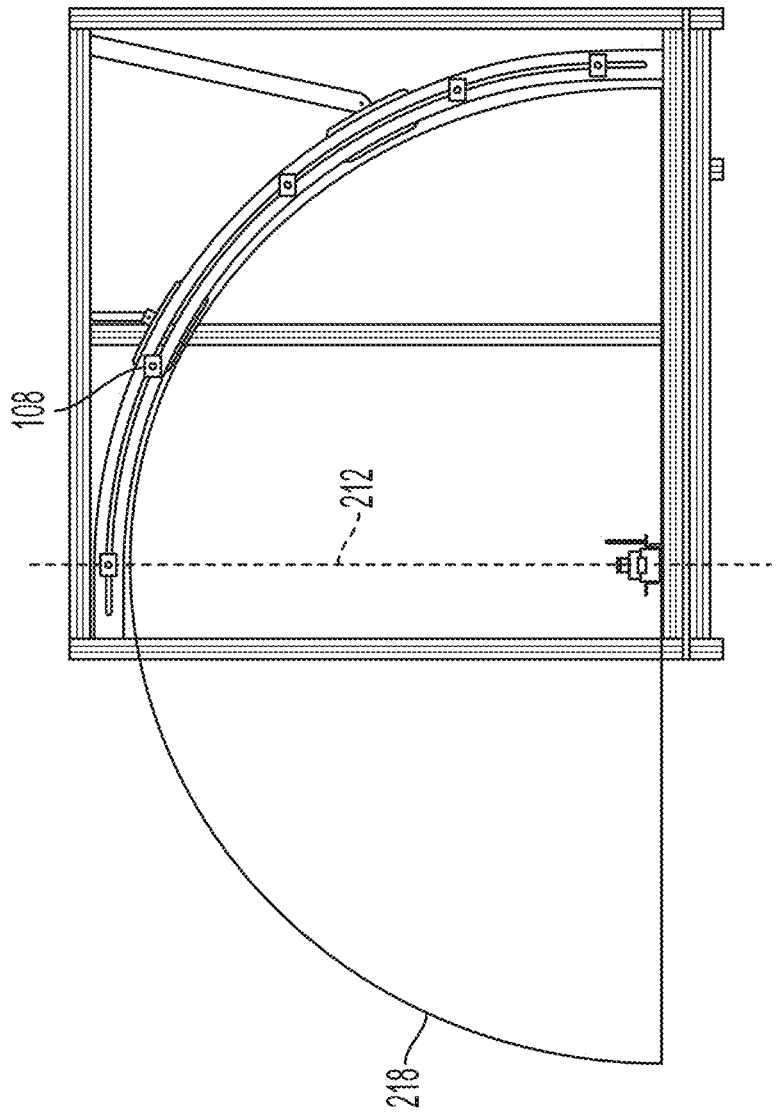
FIG. 2C illustrates a plurality of photodiodes arranged in an array, according to one or more example embodiments.

FIG. 2C further illustrates an example embodiment of the photodiodes 108 on at least the 90 degree arc of the hemisphere 218. The photodiodes 108 may be positioned such that they begin at the equator of the hemisphere, and end at a pole. In an example embodiment, five photodiodes may be positioned on the at least 90 degree arc. Alternatively, the arc may include more photodiodes to assist in increasing the resolution. The photodiodes may also be equally spaced on the at least 90 degree arc of the hemisphere. For example, photodiodes may be positioned at 0 degrees, 22.5 degrees, 45 degrees, 67.5 degrees, and 90 degrees. Alternatively, the photodiodes could be clustered near 0 degrees and 90 degrees to assist in increasing the accuracy of the detection of light emitted from the light-emitting module.

The photodiodes 108 may be used to measure the intensity and pattern of the light emitted from the light-emitting module 104. To attempt to more accurately detect the light emitted, in an example embodiment, the photodiodes 108 may be a high performance photodiode. For example, the photodiodes 108 may be broadband photodiodes.

The testing system may include simultaneously emitting light from the light-emitting module 104, and rotating the light-emitting module 104 on the mounting platform 102 as the photodiodes 108 detect the light emitted. As previously discussed, the controller 110 may be used to control the photodiodes 108, the mounting platform 102, and the light emitting module 104. The controller 110 may further be configured to gather directional light intensity data from the photodiodes 108 and output a light distribution map based on the directional light intensities.

FIG. 3 illustrates an example method for testing a light-emitting module 302, according to one or more embodiments. The following method 302 may be used with an apparatus for testing light-emitting modules. For example, the method 302 may be used with the above described system for testing 100. The method for testing a light-emitting module may include positioning a light-emitting module for a camera in a housing 304. The light-emitting module may be positioned in the center of the housing through a door in the housing. Alternatively, the housing may placed over the light-emitting module. The housing may attempt to block or reduce external light from interfering with the testing of the light-emitting module. The housing may further contain a plurality of photodiodes in an array 306. When the light-emitting module is positioned in the housing, the light-emitting module may face the photodiodes 308.

The method may further include emitting light from the light-emitting module while rotating the light-emitting module around an axis 310. While the light-emitting module is emitting light and rotating around an axis, the method may further include sensing, with the photodiodes, a plurality of directional light intensities of the light emitted from the light-emitting module 312. Based on the plurality of directional light intensities of the light emitted from the light-emitting module the method may include outputting a light distribution map based on the directional light intensities 314.

As previously discussed, the light-emitting module may be positioned in the housing so that the photodiodes can sense the light emitted. The method may further include positioning the light-emitting module in the housing in an attempt to increase the amount of light sensed by the photodiodes. The positioning of the light-emitting module with respect to the photodiodes may also represent how much of the interior cabin of a vehicle should be illuminated. To attempt to simulate the cabin of a vehicle, the photodiodes may be positioned on an arc. The arc may mimic the dimensions of the cabin of an autonomous vehicle and the light-emitting module may be placed in a position similar to that in a vehicle. For example, positioning the light-emitting module in the housing may include positioning the light-emitting module at a center of the arc on which the photodiodes are arranged.

As previously discussed, during operation it may be desirable for the light-emitting module to illuminate the interior of the cabin of a vehicle. It may also be desirable for the light-emitting module to reach the boundaries of the vehicle cabin. Therefore, the intensity of each light-emitting module can be tested. To assist in accurately testing, the light-emitting module may be positioned directly beneath the arc of photodiodes. For example, the axis around which the light-emitting module rotates may intersect the arc on which the photodiodes are arranged. Rotating the light-emitting module around the axis may further include rotating the light-emitting module through an angular range about the axis. The angular range may be between 0 degrees and 360 degrees. For example, the light-emitting module may rotate 90 degrees. Alternatively, the light-emitting module may rotate a full 360 degrees. As the light-emitting module rotates around the axis, the plurality of photodiodes may sense the directional light intensities simultaneously at predefined positions throughout the light-emitting module's rotations. Detecting directional light intensities throughout the rotation of the light-emitting module may assist in creating a three-dimensional light distribution map. The light-emitting module may rotate at predefined increments while it is completing a 360 degree rotation. For example, the light-emitting module may rotate 10 degrees at a time. The photodiodes may also detect the light emitted from the light-emitting module at predefined increments. For example, at each 10 degree rotation of the light-emitting module, the photodiodes may detect the light emitted. Alternatively, the photodiodes may continuously detect light emitted while the light-emitting module rotates.

Figure 4:
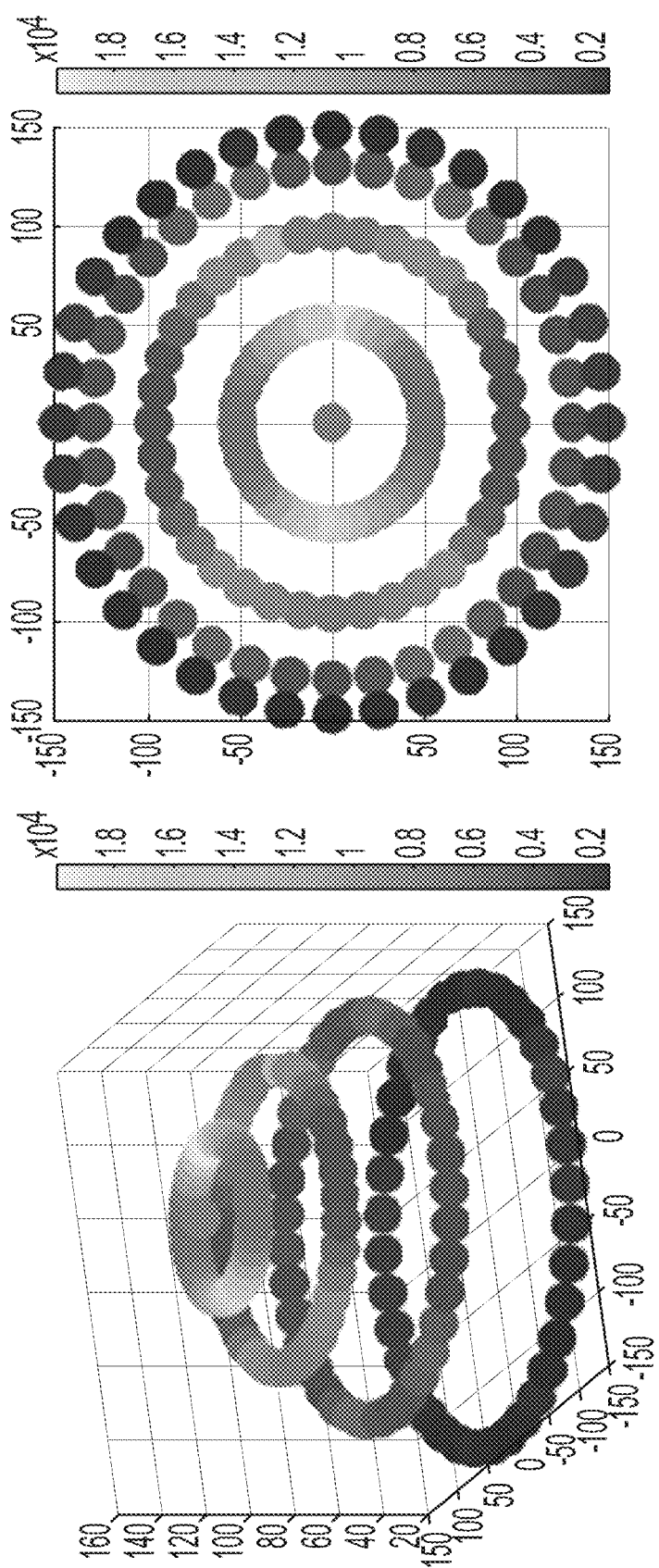
FIG. 4 illustrates a light distribution map, according to one or more example embodiments.

Testing the light-emitting module may output a light distribution map. An example three-dimensional light distribution map is shown in FIG. 4. The distribution map may indicate the intensity of light emitted from the light-emitting module at each photodiode as the light-emitting module is rotated around creating a three-dimensional map. The distribution map may also indicate if and where the light-intensity might fall short of illuminating the interior of a vehicle cabin. Outputting the light distribution map based on the directional light intensities may include compiling the plurality of directional light intensities into a light pattern. The plurality of directional light intensities may be gathered from the light detected by the photodiodes. Once the light intensities are gathered, the light distribution map may be output as a three-dimensional hemisphere. The map may take the shape of a hemisphere due to a combination of the photodiode arc, and the rotation of the light-emitting module. Alternatively, positioning the photodiodes on a frame shape different from an arc may produce a three-dimensional light distribution map in a shape other than a hemisphere. For example, the three-dimensional light distribution map could be conical.

Figure 5:
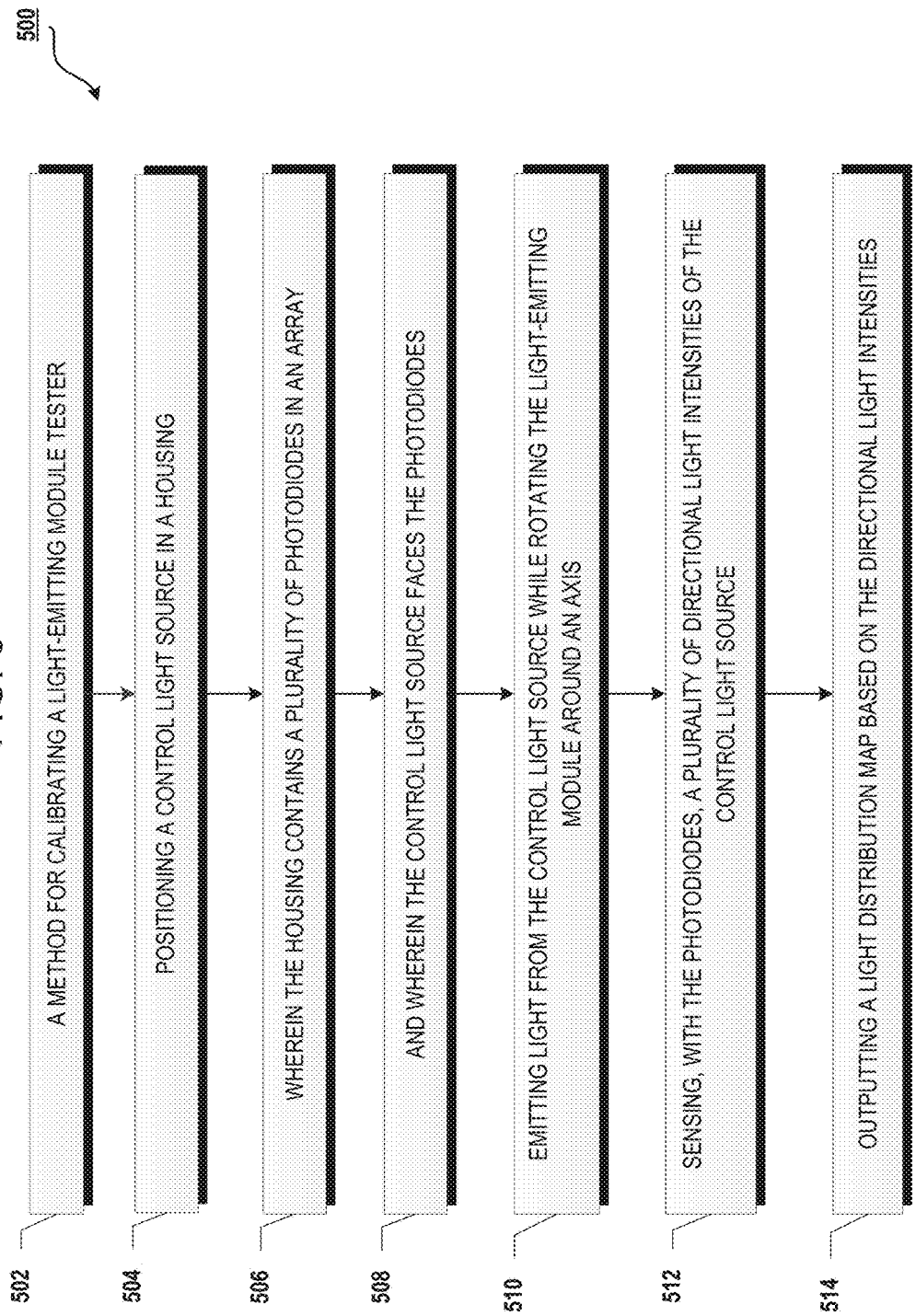
FIG. 5 illustrates a flow chart of a method for calibrating a light emitting module tester, according to one or more example embodiments.

FIG. 5 illustrates an example method for calibrating a light-emitting module tester 502, according to one or more embodiments. The following method 502 may be used with an apparatus for testing light-emitting modules. For example, the method 502 may be used with the photodiodes in the above described system for testing. The method for testing a light-emitting module may include positioning a control light source in a housing 504. The housing may attempt to block or reduce external light from interfering with the calibration. The housing may further contain a plurality of photodiodes in an array 506. When the control light source is positioned in the housing, the control light source may face the photodiodes 508.

The method for calibration may further include emitting light from the control light source while rotating the control light source around an axis 510. While the control light source is rotating, the method may include sensing, with the photodiodes, a plurality of directional light intensities of the control light source 512. Based on the directional light intensities, the method may include outputting a light distribution map 514. The light distribution map may be used to calibrate the testing module, and specifically the photodiodes. In an attempt to reduce unknown factors, a control light with a known light intensity output may be used. Therefore, the light intensities sensed by the photodiodes can be more closely regulated and any photodiode reading that is an outlier can be targeted as incorrect. The erroneous photodiode readings can also be corrected in various ways. For example, the system may account for the error while processing and outputting the light distribution map. Alternatively, the photodiode may be replaced.

In an example embodiment of calibrating a light-emitting module tester, the amount of light that the photodiodes can sense may be limited to certain intensities, in order to more precisely calibrate the photodiodes. For example, the light on the light module may have a large spectrum of known wavelengths. In order to more accurately calibrate the photodiodes, a plurality of bandpass filters may be placed in front of each of the photodiodes so that only a narrow range of the large spectrum of known wavelength reaches the photodiode. Therefore the photodiodes are accurately calibrated for the narrow range. This may be repeated for multiple narrow ranges so that the photodiodes are more accurately calibrated for a spectrum.

By limiting the range of light intensity that the photodiodes sense, it may also be easier to detect when a photodiode is improperly sensing a level of light intensity. The detected light intensity may be incorrect if the light intensity is outside of the range allowed by the bandpass filters. Additionally, more subsets of light intensity ranges may be tested to determine at which range the photodiodes are not functioning properly. The method may further include determining that there is an error in a photodiode output based on the actual level of light intensity versus the amount the photodiode sensed. For example, the method may include comparing an intensity of the control light source to the plurality of directional light intensities sensed with the photodiodes. A difference between the two may indicate that the photodiodes are not operating as expected. The photodiodes may subsequently be replaced, or accounted for in some other manner.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A system for testing a light-emitting module comprising:
   a mounting platform configured to hold a light-emitting module for a camera, wherein the mounting platform is configured to rotate;
   a housing holding a plurality of photodiodes, wherein the photodiodes are arranged in an array over at least a 90 degree arc of a hemisphere; and
   a controller configured to control operation of the system for testing the light-emitting module to carry out a plurality of operations comprising:
      determining an ability to illuminate an interior of a vehicle cabin based on a plurality of directional light intensities of light emitted from the light-emitting module sensed by the photodiodes.

2. The system of claim 1, wherein the light-emitting module faces the photodiodes, wherein the photodiodes are equally spaced on the at least 90 degree arc of the hemisphere, and wherein the mounting platform is configured to rotate around an axis that intersects the 90 degree arc on which the photodiodes are arranged.

3. The system of claim 1, wherein the mounting platform is at a center of the hemisphere, and wherein a motor is disposed on the mounting platform.

4. The system of claim 1, wherein the housing further comprises a plurality of interior walls, wherein the plurality of interior walls are covered by a light absorptive material.

5. The system of claim 1, wherein the photodiodes are broadband photodiodes.

6. The system of claim 1, wherein the controller is configured to gather directional light intensity data from the photodiodes and output a light distribution map based on the directional light intensity data.

7. The system of claim 1, wherein the light-emitting module for the camera is positioned in the housing, wherein the housing is configured to block external light from reaching the light-emitting module.

8. The system of claim 1, wherein the plurality of operations further comprise:
   rotating the light-emitting module around an axis in predetermined angle increments;
   emitting light from the light-emitting module; and
   sensing, with the plurality of photodiodes, the plurality of directional light intensities of the light emitted from the light-emitting module.

9. The system of claim 8, wherein sensing, with the photodiodes, the plurality of directional light intensities of the light emitted from the light-emitting module is performed while rotating the light-emitting module.

10. The system of claim 8, wherein the photodiodes are configured to sense the plurality of directional light intensities at the predetermined angle increments.

11. The system of claim 8, wherein rotating the light-emitting module around the axis comprises rotating the light-emitting module through an angular range around the axis, wherein the angular range is between 0 degrees and 360 degrees, and wherein the predetermined angle increments comprises 10 degrees.

12. The system of claim 1, wherein the plurality of directional light intensities correspond to an interior of a vehicle, and wherein the plurality of directional light intensities sensed by the photodiodes identify one or more locations in the interior of the vehicle that will be insufficiently lit.

13. A system for testing a light-emitting module comprising:
   a mounting platform configured to hold a control light source comprising a predetermined light intensity, wherein the mounting platform is configured to rotate;
   a housing holding a plurality of photodiodes, wherein the photodiodes are arranged in an array over at least a 90 degree arc of a hemisphere; and
   a controller configured to control operation of the system for testing the light-emitting module to carry out a plurality of operations comprising:
      sensing, with the plurality of photodiodes, a plurality of directional light intensities of the light emitted from the control light source; and
      determining whether any of the plurality of directional light intensities sensed with the photodiodes is associated with an error based on the predetermined light intensity of the control light source.

14. The system of claim 13, wherein the control light source is positioned in the housing, and wherein the housing is configured to block external light from reaching the light-emitting module.

15. The system of claim 13, further comprising:
   rotating the control light source around an axis in predetermined angle increments, wherein rotating the control light source around the axis comprises rotating the control light source through an angular range around the axis, wherein the angular range is between 0 degrees and 360 degrees, and wherein the predetermined angle increments comprises 10 degrees; and
   emitting light from the control light source.

16. The system of claim 15, wherein sensing, with the photodiodes, the plurality of directional light intensities of the light emitted from the control light source is performed while rotating the control light source.

17. The system of claim 15, wherein the photodiodes sense the plurality of directional light intensities at the predetermined angle increments.

18. The system of claim 13, further comprising processing the plurality of light intensities and accounting for the error in the plurality of directional light intensities sensed with the photodiodes.

19. The system of claim 13, wherein determining the error in the plurality of directional light intensities sensed with the photodiodes further comprises comparing the plurality of directional light intensities sensed to the predetermined light intensity of the control light source.

20. The system of claim 13, wherein the plurality of photodiodes further comprise a plurality of bandpass filters configured to reduce a range of light intensity that the photodiodes sense.

* * * * *